(12) United States Patent
Sjöström et al.

(10) Patent No.: US 6,240,803 B1
(45) Date of Patent: Jun. 5, 2001

(54) GEAR CHANGE MECHANISM IN A VEHICLE

(75) Inventors: Staffan Sjöström, Grödinge; Lars Miller, Södertälje; Ingemar Melander; Claes-Göran Nord, both of Mullsjö, all of (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/319,994

(22) PCT Filed: Nov. 2, 1998

(86) PCT No.: PCT/SE98/01978

§ 371 Date: Jun. 25, 1999

§ 102(e) Date: Jun. 25, 1999

(87) PCT Pub. No.: WO99/24281

PCT Pub. Date: May 20, 1999

(30) Foreign Application Priority Data

Nov. 11, 1997 (SE) .................................................. 9704155

(51) Int. Cl.⁷ ...................................................... G05G 1/04
(52) U.S. Cl. ................................................. 74/524; 74/547
(58) Field of Search .................................. 74/524, 473.3, 74/523, 525, 544, 546, 547

(56) References Cited

U.S. PATENT DOCUMENTS

| 455,728 | 7/1891 | Norton | 74/524 |
| 1,743,241 | 1/1930 | Schmidt | 74/524 X |
| 3,620,099 | 11/1971 | Stotz | 74/524 |
| 4,073,199 | 2/1978 | Simons | 74/524 X |
| 4,281,526 | 8/1981 | Lipscchutz . | |
| 4,823,635 | 4/1989 | Selby . | |
| 5,328,285 | 7/1994 | Grubbs et al. . | |
| 6,029,535 | 2/2000 | Kenny et al. | 74/524 X |

FOREIGN PATENT DOCUMENTS

| 286957 | 11/1990 | (JP) | 74/524 |
| 6241302 | 8/1994 | (JP) | 74/524 |

*Primary Examiner*—Mary Ann Green
(74) *Attorney, Agent, or Firm*—Ostrolenk, Faber, Gerb & Soffen, LLP

(57) ABSTRACT

A gear lever (7) is arranged between the driving seat and the passenger seat in a truck. The gear lever (7) incorporates a disengageable locking mechanism (34) by means of which it is possible to lower the gear lever (7) from a substantially vertical position of use to a position in which it does not limit the driver's mobility in the cab. When the gear lever (7) has been lowered, the driver can move from the driving side to the passenger side of the truck.

9 Claims, 1 Drawing Sheet

GEAR CHANGE MECHANISM IN A VEHICLE

RELATED APPLICATIONS

This is a 35 U.S.C. §371 national phase of International Application PCT/SE98/01978 filed Nov. 2, 1998.

BACKGROUND OF THE INVENTION

The present invention relates to a gear change mechanism of the kind used in a truck and particularly relates to the gear shift lever for the mechanism.

STATE OF THE ART

Trucks are used to meet a wide variety of transport requirements. On short journeys the truck often functions purely as a workplace, but on long journeys it is not merely a workplace but also a sleeping place and a place for recreation and relaxation between periods of work. Accordingly, trucks intended for long-distance transport are provided with a bed behind the seats and, in some cases, with highly movable seats which, when shifted towards the truck's instrument panel, increase the driver's maneuvering space in the cab between the bed and the rear seats. In some trucks the bed is arranged above the seats. In such vehicles a large space is created between the rear of the seats and the rear wall of the cab when the seats are shifted towards the instrument panel.

As the vehicle driver is most often alone in the cab during long-distance runs, a known practice is to remove the passenger seat and replace it with a simpler seat on the passenger side. This seat is most often fitted relatively far back in the vehicle so as to create a relatively large space between it and the instrument panel. As the interior of a truck cab is relatively cramped, it is difficult for the driver to move from the driving seat to the bed situated behind the seats or, where applicable, to the relatively large clear area between the rear of the seats and the rear wall of the vehicle. It is also difficult for him to move from the driving side to the clear space on the passenger side.

Said problem is particularly obvious in so called forward-built vehicles in which the cab is situated above the vehicle's engine. In such designs, the engine often protrudes into the cab between the driving side and the passenger side. The engine is covered by a noise-damping engine cover. A gear lever is usually arranged in a mounting which is fastened to the cab and situated in the engine cover. The gear lever is further connected to at least one movement-transmitting device arranged to transmit gear change movements to the vehicle's gearbox. Driver mobility in this type of vehicle is hindered by the fact that the gear lever extends into the cab and limits his freedom of movement. For the driver to make his way to the bed or any of the clear spaces, he therefore most often has to climb out of the vehicle and then climb back in behind the seats or on the passenger side. This procedure is of course tiresome and inconvenient, particularly in bad weather or the like.

Said problem may arise in vehicle types other than trucks. In buses and mobile homes, freedom of movement may be limited by the gear lever, and even in passenger cars it may be necessary to move easily between the driving seat and the passenger seat and vice versa.

OBJECTS OF THE INVENTION

The object of the present invention is to make it easier for the driver to move about in the interior of a vehicle. To this end, the invention is distinguished by a gear lever movable in the interior space of the vehicle, the gear lever being raisable to an upraised use condition and lowerable, a locking mechanism for locking the gear lever upraised upright and a disengaging device which is manually operated to act upon the locking mechanism and free the gear lever for being lowered.

The gear lever incorporates a disengageable locking mechanism which makes it possible to lower the gear lever from its substantially vertical position of use to a position in which it does not limit driver mobility in the cab. When the gear lever has been lowered, the driver can easily climb over the engine cover to clear areas in the cab or to the bed. In an advantageous application of the invention, the lowered gear lever abuts against the support, which may be a panel in the interior of the vehicle or a cover covering the vehicle engine or the like. In a further advantageous application of the invention, the gear lever is pivotable into a recess in the panel or cover, thereby obviating any kind of hindrance by the gear lever to the driver's mobility in the vehicle.

Other features distinguishing the invention are indicated in the ensuing description of an embodiment exemplifying the invention with reference to the attached drawings.

DESCRIPTION OF A PREFERRED EMBODIMENT

Figure 1:
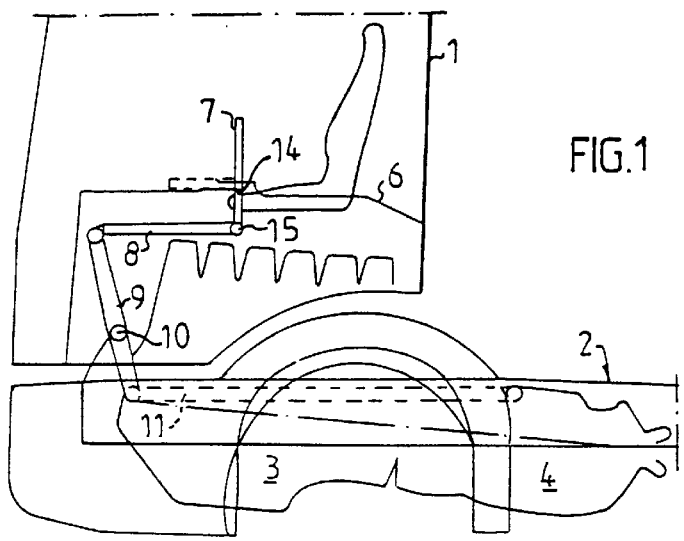
FIG. 1 shows a schematic side view of a gear change mechanism according to the invention, arranged in a vehicle cab.

A driving cab 1 is arranged on the truck as schematically depicted in FIG. 1. The cab 1 is suspended on a frame 2 in which an engine 3 and a gearbox 4 are suspended. An engine cover 6 covering the engine 3 is arranged in the cab floor. A gear lever 7 is not displaceable relative to the engine cover 6 or to the cab floor but is otherwise movable within a mounting 14. To make it possible to transmit gear change movements from the gear lever 7 to the gearbox 4, the bottom portion 15 of the gear lever 7 is connected via movement-transmitting devices 8,9,10,11 to gear change devices (not depicted) in the gearbox 4. To increase the vehicle driver's freedom of movement in the cab, the gear lever 7 is lowerable between a position of use and a lowered position. The position of use is represented by continuous lines in FIG. 1, the lowered position by broken contours.

Figure 3:
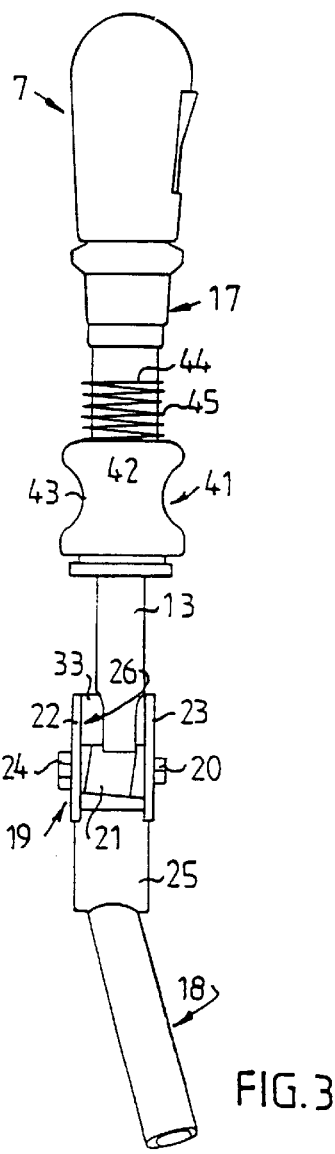
FIG. 3 shows a view from the rear of a gear change mechanism according to the invention.
Figure 2:
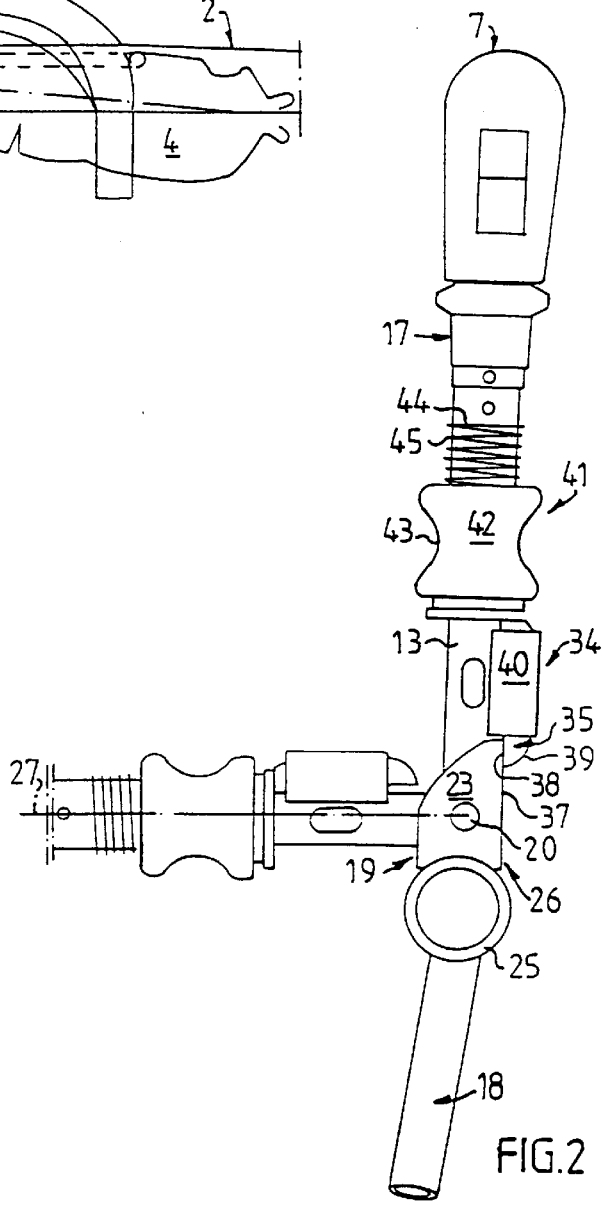
FIG. 2 shows a side view of a gear change mechanism according to the invention.

As may be seen in FIGS. 2 and 3, the gear lever 7 comprises of a first element 17 and a second element 18 which are arranged one after another and are hingingly connected to one another via a hinge 19. The hinge 19 incorporates a pin 20 which extends substantially horizontally in the transverse direction of the vehicle through a bushing 21 in the lower end 13 of the first gear lever element 17 and through first and second supporting devices 22,23 which are arranged substantially vertically. The axial position of the pin 20 is fixed relative to the bushing 21 and the supporting devices 22,23 by some form of locking device 24 such as a nut, a clip or the like. The supporting devices 22,23 extend parallel with one another in the longitudinal direction of the vehicle and are firmly connected to the upper portion 25 of the second gear lever element 18 and are connected to one another by a stop device 26 which extends substantially vertically. The stop device 26 extends across the vehicle and constitutes a stop device which limits the upward pivoting movement of the gear lever 7 towards its position of use, as may best be seen in FIG. 2. The first gear lever element 17 is pivotable about the pin 20 from the position of use to a preferably substantially horizontal position 27 represented by a chain-dotted line in FIG. 2. The first gear lever element 17 is also depicted in its lowered substantially horizontal position.

The first gear lever element 17 is lockable, as may best be seen in FIG. 3, against a first stop surface 33 on the stop device 26 by means of a locking mechanism 34 depicted in FIG. 2. The locking mechanism 34 is arranged closer to the top of the gear lever than the pin 20 is, and incorporates a locking device 35 which is arranged to be movable relative to the stop device 26 between the position in which it abuts against a second stop surface 37 on the stop device 26 and a position in which it does not abut against the stop device 26. The locking device 35 has the form of a locking pin provided with a locking surface 38 intended to cooperate with the second stop surface 37 on the stop device 26, and an arcuate surface 39 intended to facilitate the locking of the gear lever 7 when it is pivoted upwards. The first stop surface 33 and the second stop surface 37 consist advantageously of the respective sides of the stop device 26, which has with advantage a disc-shaped appearance and consists with advantage of a plate or the like. The one stop surface 33 is thus formed on the side of the plate facing the forward direction of the vehicle, while the other stop surface 37 is formed on the side of the plate facing the rear of the vehicle.

The locking device 35 is arranged for movement in an aperture which runs through a control device 40 which is connected firmly to the outer side of the first gear lever element and which is connected to a disengaging device 41 which is used for shifting the locking device 35 from the position which locks the gear lever elements 17,18 to the non-locking position. The disengaging device 41 incorporates a hand control 42 which is movable relative to the gear lever elements 17,18 and designed to be operated manually in the longitudinal direction of the gear lever in order to shift the locking device 35 from the locking position to the non-locking position. In this embodiment the hand control 42 has the form of a sleeve which surrounds the first gear lever element 17 and is movable relative thereto in the longitudinal direction between a lower position in which the locking surface 38 of the locking device 35 abuts lockingly against the second stop surface 37 on the stop device 26 and an upper position in which the locking surface 38 of the locking device 35 is shifted so far upwards relative to the gear lever elements 17,18 as no longer to abut against the stop device 26. The hand control 42 is provided with a hollow 43 all round it to make it easier to hold.

A spring device 45 is arranged between a bearing surface 44 in the upper gear lever element 17 and the hand control 42. The spring device 45, which advantageously but not necessarily consists of a coil spring which surrounds the upper gear lever element 17, is compressed when the hand control 42 is raised in order to free the gear lever elements 17,18 from one another, but its spring action presses the hand control 42 and hence also the locking device 35 down to the original position as soon as the influence of the hand control 42 decreases. A final production version will conceal the spring device 45 behind a plastic sleeve or other masking device. As the gear lever 7 extends substantially in the vertical direction when it is in the operating position, there is no risk of inadvertent gear lever lowering in the event of failure of the spring device 45. The weight of the disengaging device 41 and the locking device 34 makes the locking device 35 press downwards towards the stop device 29.

In the operating position, the gear lever 7, as depicted in FIG. 2, has a substantially vertical position in the cab 1 to make it possible to operate the vehicle's gearbox. In order to lower the gear lever 7, the hand control 42 is pulled upwards relative to the gear lever 7. As the hand control 42 is connected to the locking device 35, the locking surface 38 of the latter is lifted from locking abutment against the second stop surface 37 on the stop device 26, after which the gear lever 7 can be pivoted to the substantially horizontal position. The gear lever 7 will then be in a position which makes it easier for the vehicle driver to move between the different sides of the vehicle and any bed situated in the cab without being hindered by the gear lever. The final stage of raising the gear lever 7 back to the operating position makes the arcuate surface 39 of the locking device press against the upper portion of the stop device 26. The flexibility of the spring device 45 will then make the locking device 35 rise to such an extent as to enable it to pass the upper portion of the stop device 26. When the locking device 35 has passed the stop device 26, the spring device 45 presses the locking device 35 down to locking abutment against the second stop surface 37 on the stop device, whereupon the gear lever 7 will be back in its position of use.

The above description certainly refers to a highly advantageous embodiment but the invention may nevertheless not be limited to that embodiment but may within the scope of the patent claims below be modified in a number of alternative embodiments.

In the embodiment described, two gear lever elements 17,18 are hinged to one another but it is of course possible to design the gear change mechanism so that the gear lever 7 hinges in the region between the gear lever 7 and the movement-transmitting device 8, without departing from the concept of the invention. It is of course possible to lower the gear lever 7 to a position other than a horizontal position and it is of course possible to lower the gear lever 7, in other directions than forwards as in the embodiment described, without departing from the concept of the invention.

The embodiment described uses a disengaging device 41 which acts upon the locking device 35 in the longitudinal direction of the gear lever 7 in order to free the gear lever elements from one another. In an alternative embodiment it is of course possible to use a disengaging device 41 which shifts the locking device 35 from the stop device 26 by some means other than axial shifting of the locking device 35. One possible way may be to provide the disengaging device 41 with a lever arm or the like so that the locking device 35 is pivoted from the stop device 26 or shifted in some other manner from the stop device 26 so as to provide sufficient clearance between the locking parts 35,26.

What is claimed is:

1. A gear change mechanism for a vehicle having a gear box for vehicle operation, the gear change mechanism comprising:

a gear lever supported in the vehicle to move therein, the gear lever having a pivot hinge along its length, a gear lever element at one side of the pivot hinge, the gear lever element being pivotable around the hinge to raise and lower the gear lever;

the gear lever having a part at the other side of the pivot hinge, a movement transmitting device connected to the part of the gear lever, the movement transmitting device being operable for transmitting gear change movements from movement of the gear lever to the gear box;

the gear lever also being raisable in the vehicle relative to the movement transmitting device so as not to move the transmitting device as the gear lever is raised, and the gear lever being lowerable relative to the movement transmitting device so as not to move the movement transmitting device as the gear lever is lowered;

a locking mechanism for engaging and locking the gear lever element to the movement transmitting device when the gear lever is raised;

a disengaging device connected with the locking mechanism and operable for releasing the locking mechanism for disconnecting the gear lever from the movement transmitting device permitting lowering of the gear lever relative to the movement transmitting device; and a stop device positioned to be engaged by the gear lever element when the gear lever element is raised for stopping raising movement of the gear lever element;

wherein the stop device includes a first stop surface positioned for being abutted by the gear lever element as the gear lever element is raised, the stop device includes a second stop surface which is abutted against by the locking mechanism, and with the locking mechanism against the second stop surface and the gear lever element against the first stop surface, the gear lever element is locked in the raised position.

2. The gear change mechanism of claim 1, wherein the stop device has a first side on which the first stop surface is defined and has a second side on which the second stop surface is defined.

3. The gear change mechanism of claim 2, wherein the first and second stop surfaces are on opposite sides of the stop device.

4. The gear change mechanism of claim 2, wherein the stop device has a disc shape.

5. The gear change mechanism of claim 1, wherein the locking mechanism includes a locking device having a locking surface for lockingly abutting against the second stop surface, and the locking device includes an arcuate surface for easing the locking of the gear lever element.

6. The gear change mechanism of claim 5, further comprising a control device firmly connected to the gear lever element, and the control device having an aperture through which the locking device is movable between a locking position at the stop device and an unlocking position away from the stop device.

7. The gear change mechanism of claim 5, wherein the disengaging device is connected to the locking mechanism and the disengaging device is movable to a first position which enables the locking mechanism to lock the gear lever element in the raised position and is movable to a second position which disengages the locking mechanism for enabling the gear lever element to be lowered.

8. The gear change mechanism of claim 7, further comprising a spring connected with the disengaging device for urging the disengaging device toward the first gear lever element locking position.

9. A gear change mechanism for a vehicle having a gear box for vehicle operation, the gear change mechanism comprising:

a gear lever supported in the vehicle to move therein, the gear lever having a pivot hinge along its length, a gear lever element at one side of the pivot hinge, the gear lever element being pivotable around the hinge to raise and lower the gear lever;

the gear lever having a part at the other side of the pivot hinge, a movement transmitting device connected to the part of the gear lever, the movement transmitting device being operable for transmitting gear change movements from movement of the gear lever to the gear box;

the gear lever also being raisable in the vehicle relative to the movement transmitting device so as not to move the transmitting device as the gear lever is raised, and the gear lever being lowerable relative to the movement transmitting device so as not to move the movement transmitting device as the gear lever is lowered;

a stop device positioned to be engaged by the gear lever element when the gear lever element is raised for stopping raising movement of the gear lever element;

a locking mechanism for engaging and locking the gear lever element to the movement transmitting device when the gear lever is raised, wherein the locking mechanism includes a locking device having a locking surface for lockingly abutting against the stop device, the locking device including an arcuate surface for easing the locking of the gear lever element;

a disengaging device connected with the locking mechanism and operable for releasing the locking mechanism for disconnecting the gear lever from the movement transmitting device permitting lowering of the gear lever relative to the movement transmitting device; and a control device firmly connected to the gear lever element, the control device including an aperture through which the locking device is movable between a locking position at the stop device and an unlocking position away from the stop device.

* * * * *